INVENTORS
THOMAS J. POTTS, JR.
EUGENE F. GRANT
BY Kenway, Jenney & Hildreth
ATTORNEYS Dec. 24, 1963   T. J. POTTS, JR., ETAL   3,115,611
PULSE POWER RESOLVING SYSTEM
Filed Sept. 7, 1961

INVENTORS
THOMAS J. POTTS, JR.
EUGENE F. GRANT
BY Kenway, Jenney & Hildreth

ATTORNEYS

INVENTORS
THOMAS J. POTTS, JR.
EUGENE F. GRANT

ATTORNEYS

United States Patent Office 3,115,611
Patented Dec. 24, 1963

---

3,115,611
PULSE POWER RESOLVING SYSTEM
Thomas J. Potts, Jr., Rowley, and Eugene F. Grant, Marblehead Neck, Mass., assignors to National Company, Inc., Malden, Mass., a corporation of Massachusetts
Filed Sept. 7, 1961, Ser. No. 136,646
7 Claims. (Cl. 331—183)

This invention relates generally to control systems for radio frequency signals, and more particularly it relates to a system for automatically controlling the peak power of radio frequency pulse signals.

A conventional approach to the control of the peak power of pulses is to measure average pulse power and use this as a basis for determining peak power. However, the accuracy of this approach suffers from an inexact knowledge of such variables as shape, width, and repetition rate of the pulse signals. Accuracy can be improved through the use of comparison techniques adapted to provide a direct indication of the peak pulse power. For example, the peak amplitude of the pulse signal can be visually compared on an oscilloscope to the amplitude of an accurate reference source of power. A problem with this approach is that it does not lend itself to an automatic mode of control as is often required.

Accordingly, it is the primary object of our invention to provide a system for automatically controlling the peak power of radio frequency pulse signals which is inherently more accurate than known systems of the same general class. It is a further object of our invention to provide an alarm for indicating when the pulse generator is not operating within desired, predetermined limits. Yet another object of our invention is to provide a system which, by time sharing of equipment, substantially reduces the amount of equipment required for measuring and adjusting the peak pulse power level. Other objects of our invention will become apparent hereinafter.

In brief, we provide a gated integrating device to produce a slowly decaying output signal approximating a sawtooth waveform whose initial amplitude is equal to the peak amplitude of signals gated into the device. The pulse signal to be controlled and a continuous wave (C.W.) reference signal are alternately gated into the device. In consequence there is produced a sawtooth output signal which is a function of the relative magnitudes of the pulse signal voltage, $E_p$, and the reference signal voltage, $E_r$. Fourier analysis of the sawtooth signal shows that the fundamental component of the sawtooth output, having a frequency which is the same as the frequency at which the C.W. signal is gated into the device, disappears when the peak amplitude of the pulse signal equals the amplitude of the C.W. reference signal. This fundamental component of the output signal is used as an error signal for a servo device which controls the peak output of the pulse source and for an alarm device which indicates any malfunction.

Our invention accordingly comprises the features of construction, combination of elements, and arrangement of parts which will be exemplified in the construction hereinafter set forth, the scope of the invention being indicated in the claims.

For a fuller understanding of the nature and objects of our invention, reference should be had to the following detailed description taken in connection with the accompanying drawings in which.

Figure 1:
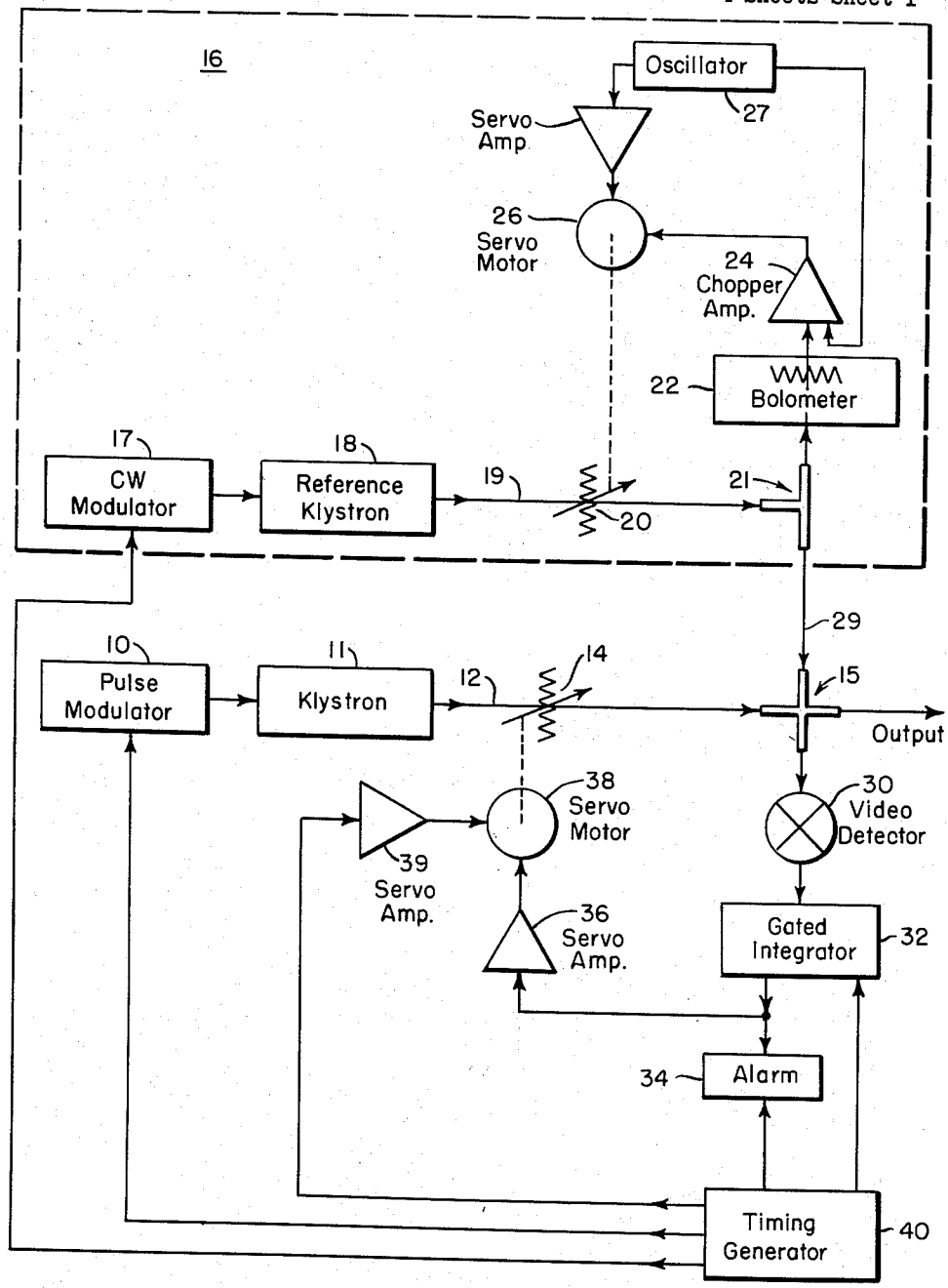
FIG. 1 is a line and block diagram of a preferred embodiment of our invention.

As shown in FIG. 1, a pulse modulator 10 supplies a modulating signal to a klystron 11 which produces the radio frequency pulse signal to be controlled according to the invention. Coupled to the klystron 11 is a waveguide 12, which has a motor driven attenuator 14 associated with it. Attenuator 14 serves to establish the pulse signal from the klystron at a desired level and a directional coupler 15 serves to sample a portion of the signal for control of the attenuator.

To control the attenuator there is provided a reference source 16 which supplies a predetermined level of C.W. signal for comparison with the pulse output signal. This reference source 16, as shown, includes an interrupted C.W. modulator 17 and a reference klystron 18. A wave guide 19, having a motor driven attenuator associated with it, couples the reference singal output to a power divider 21 and the latter feeds a portion of the reference signal to a bolometer 22. The signal from the bolometer 22 is amplified in a chopper amplifier 24 and applied to the control winding of a servo motor 26. An oscillator 27 supplies an appropriate reference signal, such as a sixty cycle signal, for the reference winding of the servo motor 26 and for the chopper amplifier 24. The servo motor 26 is mechanically coupled to the attenuator 20 so as to maintain the C.W. output of the reference klystron 18 at a predetermined level.

The power divider 21 is also coupled by a wave guide 29 to one of the arms of directional coupler 15 which provides a common path for the reference signal and the pulse signal leading to a video detector 30. The output circuit of the video detector 30 is connected to a gated integrating device 32 where the error signal for controlling the attenuator 14 is developed. This error signal is fed to a servo amplifier 36 which powers the control winding of a servo motor 38 and to an alarm 34. The reference winding of the servo motor 38 is powered by a servo amplifier 39 to which a reference signal is supplied by a timing generator 40. Finally, servo motor 38 has its drive shaft mechanically coupled to the attenuator 14.

Figure 2:
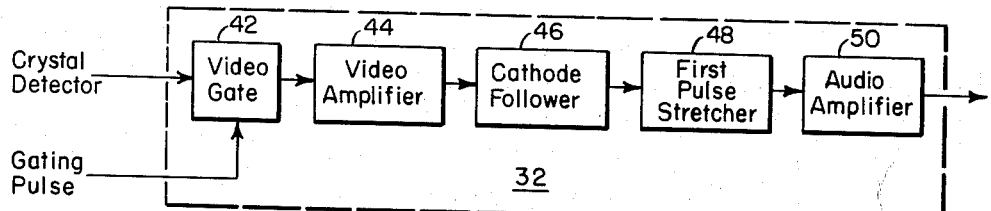
FIG. 2 is a line and block diagram of the gated integrating device shown in FIG. 1.

The gated integrator 32 is constructed as shown in FIG. 2. The input stage of the gated integrator 32 comprises a video gate 42 which opens in response to a timing signal from the timing generator 40 so that the output of the video detector 30 is effectively connected to the input of a video amplifier 44. In the absence of a video gate timing signal, the video gate 42 is closed. Connected to the video amplifier 44 by an impedance matching cathode follower 46 is a pulse stretcher device 48. The pulse stretcher device 48 has a very short charge time constant compared with the width of the pulses generated by the klystron 11 to enable the pulse stretcher to charge up to the peak value of the first input pulse. Also it has a relatively long discharge time constant so that the initial voltage decays at a very slow, approximately linear rate during the interval between gating pulses. A pulse stretching device 48 of this type can be realized in a number of ways known to those skilled in the art. For instance, a capacitor can be charged through a diode having a high back resistance and discharged through a large resistor. In this way, there is provided an output waveform from the pulse stretcher 48 approximating a sawtooth signal which has the same peak amplitude as an input pulse, but has a very much greater width. In practice, two or more pulse stretchers can be connected in cascade to obtain the long discharge time constant that is required, although each pulse stretcher stage should be preceded by a cathode follower for impedance matching. To simplify the drawing, only one pulse stretcher stage has been shown and this is connected to an audio amplifier 50 from which the error signal for the system is derived.

Figure 3:
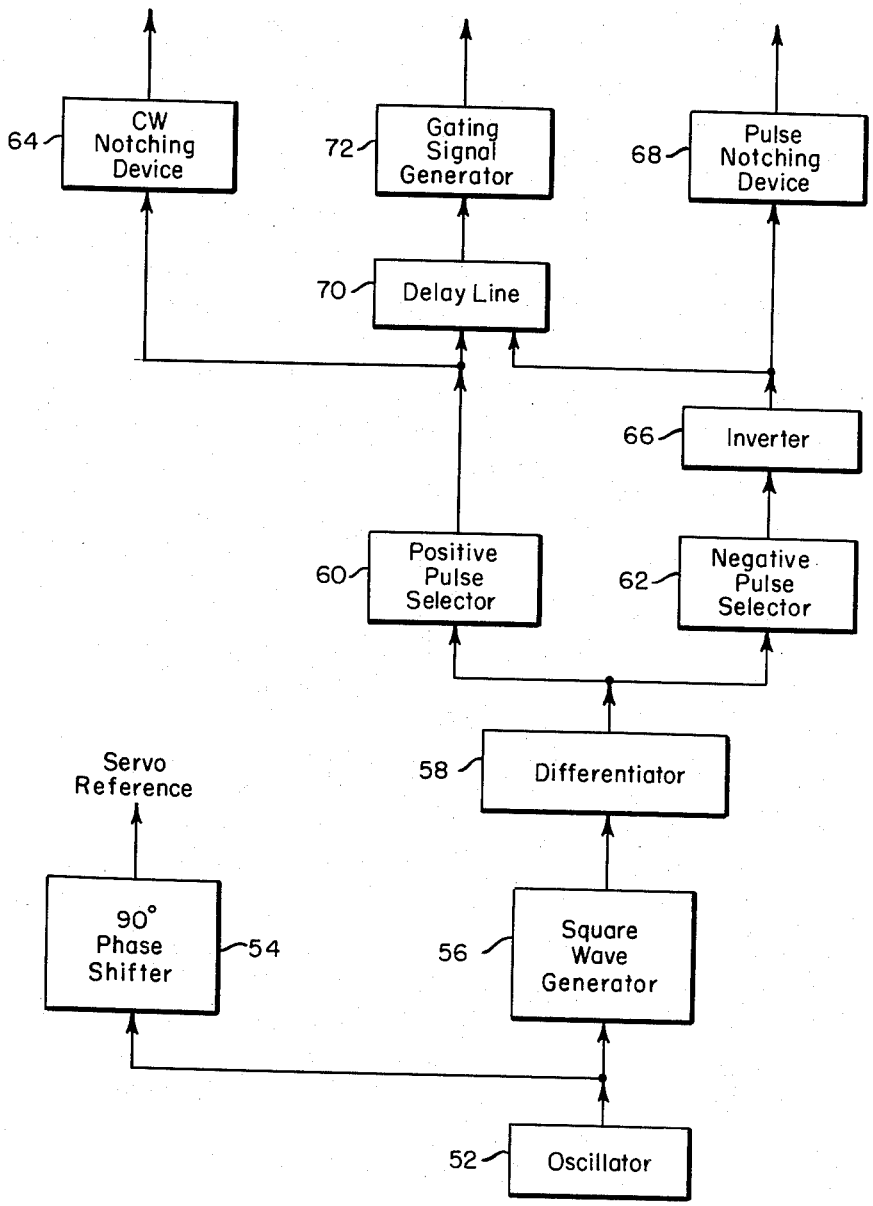
FIG. 3 is a block and line diagram of the timing generator shown in FIG. 1.
Figure 4:
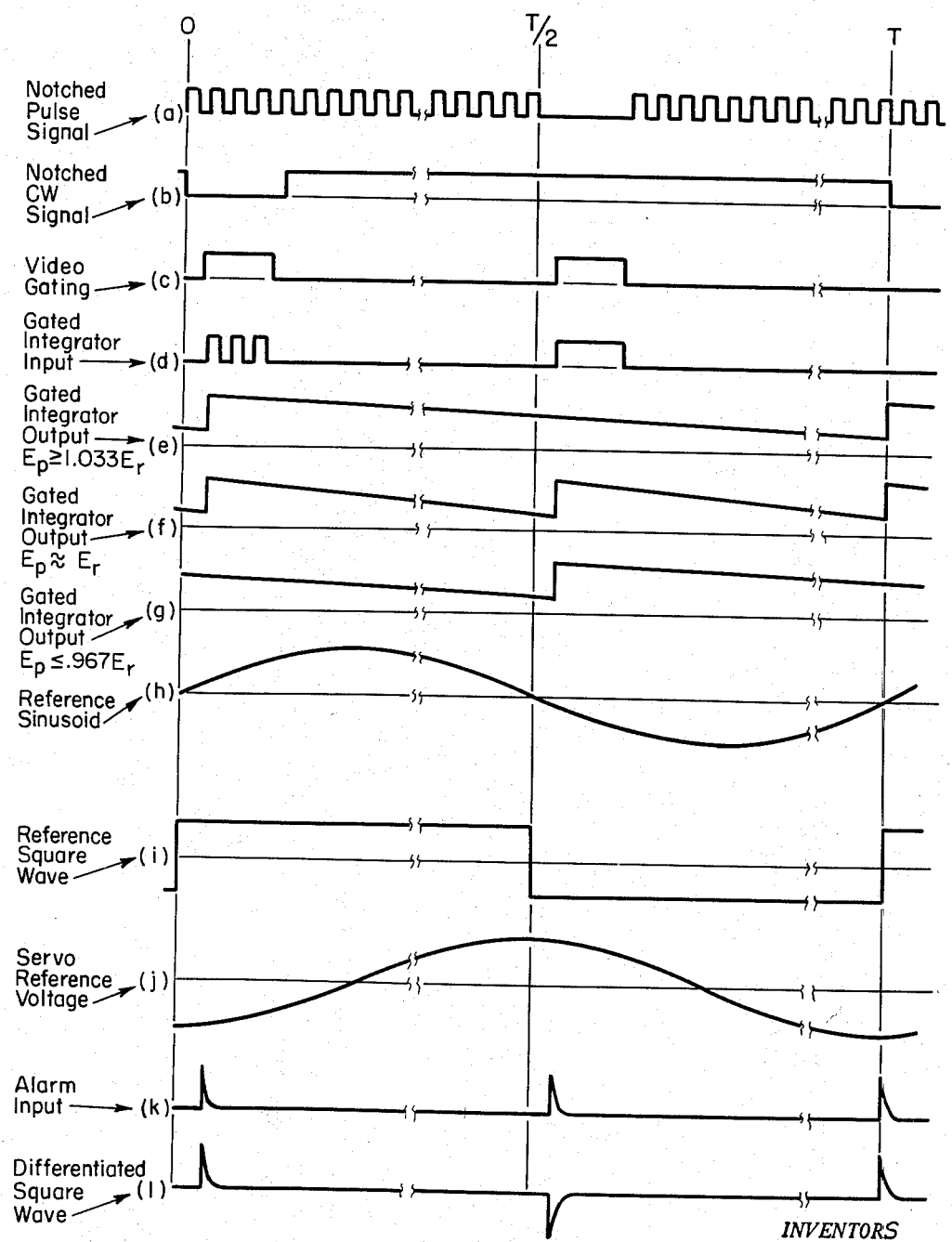
FIG. 4(a) represents the pulse signal whose magnitude is to be regulated.
FIG. 4(b) represents the notched C.W. reference signal.
FIG. 4(c) represents the gating signal for the gated integrating device.
FIG. 4(d) represents the input to the gated integrating device.
FIG. 4(e) represents the output of the gated integrating device when $E_p \geq 1.033 E_r$.
FIG. 4(f) represents the output of the gated integrating device when $E_p \approx E_r$.
FIG. 4(g) represents the output of the gated integrating device when $E_p \leq .967 E_r$.
FIG. 4(h) represents the repetition rate reference sinusoid.
FIG. 4(i) represents the repetition rate square wave.
FIG. 4(j) represents the reference voltage applied to the reference winding of the servo motor controlling the pulse source.
FIG. 4(k) represents the alarm input signal when the output of the gated integrating device is as shown in FIG. 4(f)
FIG. 4(l) represents the signal generated in the timing generator by differentiation of the repetition rate square wave of FIG. 4(i)

Reference will now be made to FIG. 3 where a detailed diagram in the timing generator 40 appears and to FIG. 4 where diagrams of the timing signals are illustrated. As shown in FIG. 3 an oscillator 52 which generates a sinusoidal signal (FIG. 4($h$)) is the basic timing source. The frequency of this signal corresponds to the repetition rate of the system. Connected to the oscillator 52 is a phase shifter 54 and a square wave generator 56. The phase shifter 54 introduces a 90° phase shift in the signal (FIG. 4($j$)) which is applied to the reference winding of the servo motor 38 through the servo amplifier 39. Thus, only that component of the error signal from the gated integrator 32 (FIG. 1) which is in phase with the timing sinusoid and hence in quadrature with the reference winding signal will be effective in controlling the servo motor 38. The square wave generator 56 amplifies and clips the sinusoidal signal from the oscillator 52 thereby providing a square wave (FIG. 4($i$)) in phase with and of the same frequency as the sinusoidal signal. From the output signal associated with the square wave generator 56 are derived by differentiator 58 alternating positive and negative pulses (FIG. 4($l$)) corresponding to the positive-going and negative-going edges of the square wave. As shown in FIG. 4($l$), the positive pulse corresponds to the start of a cycle and the negative pulse occurs midway in the cycle. A positive pulse selection device 60 and a negative pulse selection device 62, which may be constituted by appropriately connected diodes, selectively transmit the pulses. The positive pulse is fed to a C.W. notching device 64 which effectively disables the reference source 16 for periodic intervals so that only the pulse signal is present at the output of the video detector 30 during these intervals. This operation of disabling one of the radio frequency power sources will hereinafter be referred to as "notching-out." The C.W. signal is notched out at times 0, T, 2T, . . . $nT$ ($n=$an integer), where T is the period of the timing signal from the oscillator 52. The time interval during which the C.W. is notched out should be long enough to include several signal pulses for reasons to be explained subsequently. Notching-out may be accomplished in a number of ways well known to those skilled in the art, for example, by use of a monostable multivibrator to which modulator 17 is responsive. The negative pulse from the negative pulse selector 62 is operated upon by an inverter 66, so as to produce a positive pulse voltage which is then fed to a pulse signal notching device 68. The pulse signal notching device 68 is similar to the C.W. notching device 64 except that it is used to disable the pulse modulator 10 for short intervals of time commencing at times $$\frac{T}{2}, \frac{3T}{2}, \frac{5T}{2}, \cdots \frac{mt}{2}$$

($m=$an odd integer). If the pulse signal modulator is adapted to accomplish the same result by other means, then of course notching device 68 can be eliminated and synchronization of oscillator 52 can be had with such other means.

The positive pulses from the positive pulse selector 60 and the inverted negative pulses from the inverter 66 are also passed through a delay line 70 to a gating signal generator 72. The delay is intended to insure that the gated integrator which is controlled by these signals from generator 72, is not turned on before the C.W. or pulse signal is completely notched out. More particularly, the gating signal generator 72 produces a gating signal (FIG. 4($c$)) for the video gate which is slightly narrower than the notching signal from the notching devices 64 and 68, so that the video gate 42 is opened slightly after the occurrence of each one of the notching signals and is closed slightly before the notching signals end.

The operation of our invention may be best understood by reference to FIG. 4 in conjunction with FIG. 1 and FIG. 2. The time scale of certain of the waveforms in FIG. 4 is broken in order that the pulse signal, the notching-out, etc., may all be shown in expanded size within the limits of the drawing. For example, the time period for one pulse may be of the order of two microseconds whereas the total repetition period T may be of the order of two milliseconds. The pulse signal as shown in FIG. 4($a$) is notched-out for a short period of time beginning at the halfway point of the repetition period T established by the timing generator 40. The reference signal from the reference source 16 is a C.W. signal which is notched-out at the beginning of each repetition period (FIG. 4($b$)). Alternate sampling of the reference signal and the pulse signal each without the presence of the other is performed by the gated integrator 32. As previously explained, the video gate 42 of the gated integrator 32 receives two gating signals per period (FIG. 4($c$)). The first gating signal coincides with the C.W. notch so that only the pulse signal is present at the input of the gated integrator 32. The second gating signal occurs when there is no pulse signal, only the C.W. signal being present. The input to the gated integrator 32 is shown in FIG. 4($d$). Since the delay introduced into the gating signals by the delay line 70 is small compared to the repetition period T, e.g., one microsecond as compared to two milliseconds, as an approximation it may be said that the pulse stretcher 48 in the gated integrator 32 is impressed with an alternating input consisting of first the pulse signal at the beginning of each repetition period, and then the C.W. signal at the half-way point of each repetition period. The notching-out of the C.W. is wide enough to span several detected pulses thereby insuring that the pulse stretcher 48 charges up to the peak voltage of the pulses.

The magnitude as a function of time of the output voltage from the pulse stretcher 48, V($t$), in response to a sample input signal of magnitude $E_1$ may be expressed as $$V(t) = E_1 e^{\frac{-t}{RC}} \approx E_1\left(1 - \frac{t}{RC}\right) \tag{1}$$

Since the output time constant of the pulse stretcher preferably should be at least fifteen times greater than the repetition period of the system, i.e., $RC \geq 15T$, at $t=T/2$ $$V(T/2) = E_1\left(1 - \frac{T}{2RC}\right) = E_1\left(1 - \frac{1}{30}\right) = .967E_1 \quad (2)$$

If the sample which is impressed on the pulse stretcher 48 at time $T/2$ has a magnitude $E_2$, the effect of this sample will be negligible if $.967E_1$ is equal to or greater than $E_2$. In effect, the second sample is suppressed and the output of the pulse stretcher is a signal having a repetition period $T$ and having its sharply rising edge coincident with the first sample being applied to the pulse stretcher. The decay is very nearly linear so that the output signal may be represented as a sawtooth. If on the other hand $E_1$ is equal to or less than $.967E_2$, the first sample is suppressed and a sawtooth signal is produced which has a repetition period $T$, but has a sharply rising edge coincident with the occurrence of the second sample. When the two signals are approximately equal, that is $.967E_2 \leq E_1 \leq 1.033E_2$, neither sample is completely suppressed. Rather the output of the pulse stretcher is a sawtooth signal having two sharply rising edges during each period $T$, the edges being alternately coincident with the first sample and then the second sample.

FIGS. 4(e) to 4(g) illustrate the output waveforms of the pulse stretcher 48. In FIG. 4(e), $E_p$, the pulse signal, is greater than $1.033E_r$, the reference signal, so that a sawtooth having a peak amplitude $E_p$ and a period $T$ with its sharply rising edge coincident with the first sampling pulse signal is produced. In FIG. 4(g), $E_p$ is less than $.967E_r$ so that a sawtooth having a peak amplitude $E_r$ and a period $T$ is produced, the sharply rising edge of this sawtooth being 180° out of phase with the rising edge of the sawtooth of FIG. 4(e).

In FIG. 4(f), $E_p$ is very nearly equal to $E_r$, that is $E_r \leq .967E_p \leq 1.033E_r$, with the result that a sawtooth distinctively different from those of FIGS. 4(e) and 4(g) is produced. It is a "double sawtooth," having sharply rising edges spaced $T/2$ apart. The magnitude at the time $T=0, T, 2T \ldots nt$ ($n=$an integer) is $E_p$, as a result of sampling of the pulse signal. The magnitude at the time $$t = \frac{T}{2}, \frac{3T}{2}, \frac{5T}{2} \ldots \frac{mT}{2}$$

($m=$an odd integer) is $E_r$ corresponding to the sampling of the reference C.W. signal. As the magnitude of $E_p$ increases with respect to $E_r$ the voltage output of the pulse stretcher 48 during the period $t=0$ to $t=T/2$ increases and the sloping line representing the decaying output moves in an upward direction until $E_p=1.033E_r$ at which point the double-edge sawtooth disappears and the sawtooth of FIG. 4(e), having a single sharply rising edge coincident with the pulse sample, results. Likewise, as the magnitude of $E_p$ decreases with respect to $E_r$, the waveform of FIG. 4(f) approaches that of FIG. 4(g) and becomes identical with FIG. 4(g) at $E_p = .967E_r$.

These characteristic voltage waveforms, which are a function of the relative magnitudes of the reference C.W. voltage and the regulated pulse signal voltage, are used to develop an error signal in response to which the magnitude of the pulse signal is altered. It can be shown that a sawtooth wave having a period $T$, a peak-to-peak magnitude $E$ and a sharply rising edge which occurs at a time equal to $T/2$ may be expressed, using a Fourier series, as:

$$\frac{2}{\pi}E(\sin T - \tfrac{1}{2}\sin 2T + \tfrac{1}{3}\sin 3T - \tfrac{1}{4}\sin 4T + \ldots) \quad (3)$$

(This formula may be found at page 22 of "Radio Engineers' Handbook" by Terman, 1943 edition.) Therefore, when $E_p$ is less than $.967E_r$ (FIG. 4(g)), the fundamental component of the gated integrator 32 output is $$\frac{2}{\pi}E_r \sin \omega t$$

When $E_p$ is greater than $1.033E_r$ (FIG. 4(e)) the fundamental component of the gated integrator 32 output is $$\frac{2}{\pi}E_p \sin(\omega t + \pi)$$

which equals $$\frac{-2}{\pi}E_p(\sin \omega t)$$

Finally, when $E_p$ equals $E_r$ (FIG. 4(f)), the frequency of the sawtooth is double what it is in FIG. 4(e), so that the fundamental component is $$\frac{-2}{\pi}E_p(\sin 2\omega t)$$

In other words, no $\omega t$ frequency component exists at the desired operating point.

The torque on the servo motor 38 is a function of the product of the voltage applied to the reference winding and that component of the signal voltage applied to the control winding which is in phase quadrature with the reference voltage. As shown in FIG. 4(j), the voltage applied to the reference winding is in phase quadrature with the sinusoid generated by oscillator 52, FIG. 4(h). Thus, when the amplitude of the pulse signal begins to deviate appreciably from that of the reference signal, the servo motor 38 is caused to rotate and the setting of the attenuator 14 is changed to correct for this deviation.

The precise operation of the servo system may be quantitatively expressed in terms of the open loop transfer characteristic, i.e., the relation of the voltage applied to the servo motor control winding to the difference in magnitude of the reference and pulse voltages. When $E_p$ is greater than or equal to $1.033E_r$, the peak-to-peak amplitude $A_1$ of the sawtooth may be expressed as $$A_1 = V(0) - V(T) = E_p - E_p\left(1 - \frac{T}{RC}\right) \quad (4)$$

$$= E_p - E_p\left(1 - \frac{T}{15T}\right) \quad (5)$$

$$= \frac{E_p}{15} \quad (6)$$

$$= .067E_p \quad (7)$$

As may be seen from Expression 3 the amplitude of the fundamental frequency component of the sawtooth is directly proportional to $A_1$, and thus may be written as $$B_1 = KA_1 \quad (8)$$

where $B_1$ is the amplitude of the fundamental.

Since $A_1 = .067E_p$ Expression 8 may be rewritten as:

$$B_1 = K_1 E_p \quad (9)$$

where $K_1$ is the proportionality constant. The gain with respect to variations in pulse level is calculated by differentiating Expression 9 with respect to $E_p$.

$$G_1 = \frac{dB_1}{dE_p} = \frac{d(K_1 E_p)}{dE_p} = K_1 \quad (10)$$

When $E_p$ is greater than $.967E_r$, but less than $1.033E_r$, a Fourier expansion of the sawtooth waveform reveals that the amplitude $B_2$ of the fundamental component is proportional to the difference in magnitudes of the pulse and reference signals. Thus:

$$B_2 = K_2(E_p - E_r) \quad (11)$$

where $K_2$ is the proportionality constant. $K_2$ may be calculated from the condition that at the point where $E_p = 1.033E_r$, the wave shape changes from a double edged sawtooth to a single edged sawtooth with $E_r$ suppressed. The fundamental component as calculated by Expressions 9 and 11 must be the same at this point, therefore $$B_1 = B_2 \quad (12)$$

or $$K_1(1.033E_r) = K_2(1.033E_r - E_r) \quad (13)$$
$$K_1(1.033E_r) = K_2(.033E_r) \quad (14)$$
$$K_2 = 31K_1 \quad (15)$$

The gain with respect to the variations of pulse level is:

$$G_2 = \frac{dB_2}{dE_p} = d\frac{[K_2(E_p - E_r)]}{dE_p} = K_2 = 31K_1 = 31G_1 \quad (16)$$

When $E_p$ is less than or equal to $.967E_r$, the pulse signal is completely suppressed and the Fourier expansion gives a fundamental component $B_3 = K_3 E_r$. The gain is equal to zero under these circumstances since:

$$G_3 = \frac{dB_3}{dE_p} = d\frac{(K_3 E_r)}{dE_p} = 0 \quad (17)$$

Figure 5:
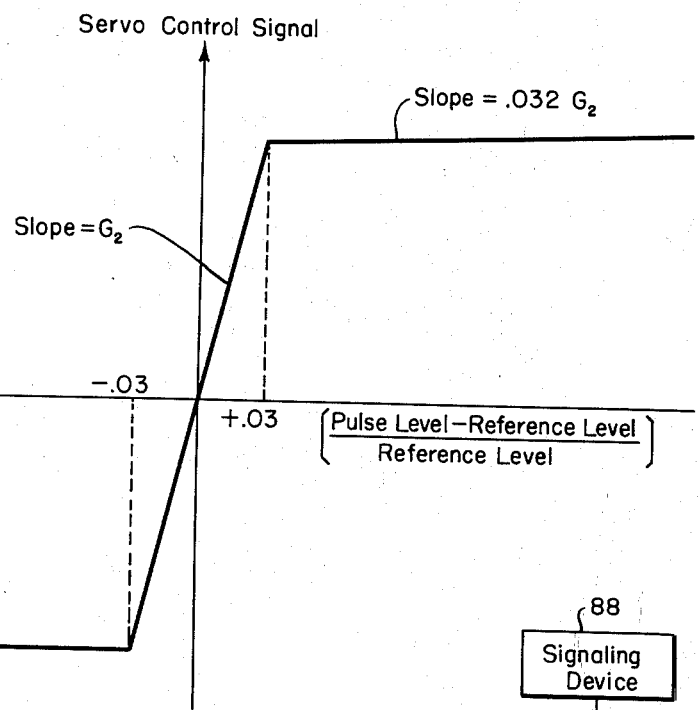
FIG. 5 is a representation of the normalized open loop transfer characteristic of the servo system which controls the output of the pulse source.

A plot of the open loop transfer characteristic is shown in FIG. 5. From FIG. 5 it will be seen that the system is linear in the region within ±3% of the null. Outside this range the level of the error signal is nearly constant, so that a high loop gain is possible without risk of high amplitude oscillations.

Figure 6:
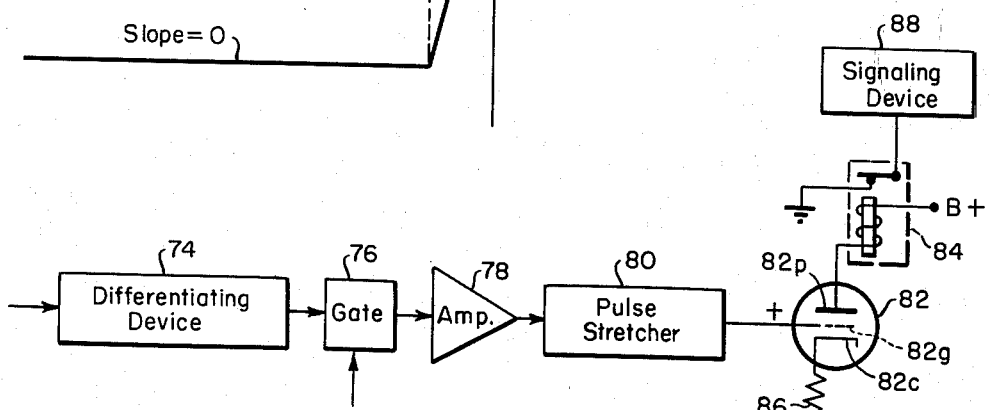
FIG. 6 is a block and line diagram of the alarm shown in FIG. 1.

In order to indicate any failure in the operation of the system, a fail-safe alarm circuit 34 is provided. The alarm 34 is shown in more detailed form in FIG. 6. A portion of the sawtooth output signal from the gated integrator 32 is fed to a differentiating device 74. The slope of the output signal from the gated integrator 32 corresponding to the sharply rising edge of the sawtooth is very steep, while at other times the slope is quite small. Differentiating device 74 accordingly produces pulses coincident with the sharply rising edges of the sawtooth and virtually no output at other times as shown in (FIG. 4(k)). These pulses are passed by a gate 76 if they occur contemporaneously with the gate conditioning signal which is obtained from the timing generator 40. The gate conditioning signal consists of a pulse which occurs contemporaneously with the opening of the video gate 42 (FIG. 2) for the detected RF pulses. At this time only if $E_p$ is greater than $.967E_r$ will the sawtooth exhibit a sharply rising edge so that a pulse is presented to the gate 76. Assuming that a pulse is present, it is passed to an amplifier 78 and thence to a pulse stretcher 80 which places a positive potential on the grid 82g of a vacuum tube 82. The plate 82p of the tube is connected through the coil 84 of a normally closed relay to B+. The cathode 82c of the tube 82 is connected to ground through a cathode resistor 86. A positive voltage on the grid 82g causes the tube to conduct heavily and the relay 84 to be energized. The contacts of the relay 84 when closed, serve to energize a signalling device 88, such as a bell or a light.

The pulse stretcher 80 is preferably adjusted so as to produce sufficient positive voltage after being impressed with a pulse, to keep the tube 82 conducting and the relay 84 energized for a period of time approximately two repetition periods. If the pulse signal is so low with respect to the reference signal so that it is suppressed in the gated integrator 32, that is if $E_p$ is less than $.967E_r$, the tube 82 becomes cut off and the relay 84 de-energized. In consequence, the contacts of the relay close and the alarm becomes energized.

If there is a failure in the system the probability is high that the input signal to the tube 82 will be absent so that in this case the alarm is also energized.

Thus we have described a system which may be used to regulate the peak amplitude of a pulse signal and to indicate when the amplitude is outside a preset operating range. Our invention is based upon the detection of the fundamental component of the unique wave shapes which are generated by sampling first the pulse signal and then the reference signal for brief intervals of time in a prescribed manner.

As will be apparent to one skilled in the art, however, the embodiment described is susceptible of various modifications within the spirit and scope of the invention. For instance, manual adjustments can be made to take the place of the automatic adjustments by the servo control system.

Furthermore, the system can be adapted to provide measurements only, rather than control of pulse level, by measurement of the in-phase and quadrature components of the fundamental output of the gated integrator 32.

It will be understood, therefore, that the invention is not limited to the details of what has been described herein by way of illustration, but rather it is limited only by the scope of the appended claims.

Having described our invention, what we claim as new and desire to secure by Letters Patent is:

1. In a system for determining the peak power level of a pulsed radio frequency signal, the combination including means to provide a continuous wave signal of radio frequency having a standard power level, means to sample periodically the peak amplitude of the reference signal and the peak amplitude of the unknown signal, means to produce a signal having the form of a continuous series of sawtooths in response to the samples of the pulse signal and the reference signal, and means to produce a signal which is a function of a selected frequency component of said sawtooth signal.

2. In a system for determining the peak power level of a pulsed radio frequency signal, which is repetitively interrupted at a predetermined rate, the combination including means to provide a continuous wave signal of radio frequency having a standard power level to serve as a reference for the pulse signal, means repetitively to interrupt the reference signal at the same rate as said pulse signal is interrupted and for a predetermined interval occurring at a different time from that during which the pulse signal is interrupted thereby to create a series of notches in the reference signal waveform, means to combine and detect the reference signal and the pulse signal, means to sample successively the peak amplitude of the detected signal when the notches occur in the reference signal and when the pulse signal is interrupted, means to produce a signal having the form of a continuous series of sawtooths in response to the samples of the detected signal, and means to provide a signal which is a function of the component of said sawtooth signal whose frequency corresponds to said repetition rate at which said pulse signal is interrupted.

3. In a system for determining the peak power level of a pulsed radio frequency signal which is repetitively interrupted at a predetermined rate, the combination including means to provide a continuous wave signal of radio frequency having a standard power level, means to sample periodically the peak amplitude of the reference signal and the peak amplitude of the unknown signal, means to produce a signal having the form of a continuous series of sawtooths in response to the samples of the pulse signal and the reference signal, means to derive from said sawtooth signal an error signal which is a function of the component of said sawtooth signal whose frequency corresponds to the repetition rate at which the pulse signals are interrupted, means to generate a signal having the same frequency as said error signal but in quadrature phase relation thereto, a servo motor having a signal winding and a reference winding responsive to said error signal and said quadrature signal respectively, and means disposed in driven relation to said servo motor to control the power level of the pulse signal.

4. In a system for determining the peak power level of a pulsed radio frequency signal, which is repetitively interrupted at a predetermined rate, the combination including means to provide a continuous wave signal of radio frequency having a standard power level to serve as a reference for the pulse signal, means repetitively to interrupt the reference signal at the same rate as said pulse signal is interrupted and for a predetermined interval occurring at a different time from that during which the pulse signal is interrupted thereby to create a series of notches in the reference signal waveform, means to combine and detect the reference signal and the pulse signal, means to sample during uniformly spaced intervals successively the peak amplitude of the detected signal when the notches occur in the reference signal and when the pulse signal is interrupted, an integrator having short charge and long discharge times to produce a signal having the form of a continuous series of sawtooths in response to the samples of the detected signal, means to derive from said sawtooth signal an error signal which is a function of the component of said sawtooth signal whose frequency corresponds to the repetition rate at which the pulse signals are interrupted, means to generate a signal having the same frequency as said error signal but in quadrature phase relation thereto, a servo motor having a signal winding and a reference winding responsive to said error signal and said quadrature signal respectively, and means disposed in driven relation to said servo motor to control the power level of the pulse signal.

5. In a system for determining the peak power level of a pulsed radio frequency signal which is repetitively interrupted at a predetermined rate, the combination including means to provide a continuous wave signal of radio frequency having a standard power level to serve as a reference for the pulsed signal, means repetitively to interrupt the reference signal at the same rate as the pulse signal is interrupted and for a predetermined interval occurring at a different time from that during which the pulse signal is interrupted thereby to create a series of notches in the reference signal waveform, means to combine and detect the reference signal and the pulse signal, means to sample during uniformly spaced intervals successively the peak amplitude of the detected signal when the notches occur in said reference signal and when the pulse signal is interrupted, said sampling means including a gate circuit which is conditioned in synchronism with the interruptions in the pulse signal and the reference signal, an integrating device having long charge and short discharge times to produce a signal having the form of a continuous series of sawtooths in response to the samples of the detected signal, and means to produce a signal which is a function of the component of said sawtooth signal whose frequency corresponds to the repetition rate at which the pulse signal is interrupted.

6. In a system for determining the peak power level of a pulsed radio frequency signal which is repetitively interrupted at a predetermined rate, the combination including means to provide a continuous wave signal of radio frequency having a standard power level to serve as a reference for the pulsed signal, means repetitively to interrupt the reference signal at the same rate as the pulse signal is interrupted and for a predetermined interval occurring at a different time from that during which the pulse signal is interrupted thereby to create a series of notches in the reference signal waveform, means to combine and detect the reference signal and the pulse signal, means to sample during uniformly spaced intervals successively the peak amplitude of the detected signal when the notches occur in said reference signal and when the pulse signal is interrupted, said sampling means including a gate circuit which is conditioned in synchronism with the interruptions in the pulse signal and the reference signal, an integrating device having long charge and short discharge times to produce a signal having the form of a continuous series of sawtooths in response to the samples of the detected signal, means to derive from said sawtooth signal an error signal which is a function of the component of said sawtooth signal whose frequency corresponds to the repetition rate at which the pulse signals are interrupted, means to generate a signal having the same frequency as said error signal but in quadrature phase relation thereto, a servo motor having a signal winding and a reference winding responsive to said error signal and said quadrature signal respectively, and means disposed in driven relation to said servo motor to control the power level of the pulse signal.

7. In a system for determining the peak power level of a pulsed radio frequency signal, which is repetitively interrupted at a predetermined rate, the combination including means to provide a continuous wave signal of radio frequency having a standard power level to serve as a reference for the pulse signal, means repetitively to interrupt the reference signal at the same rate as said pulse signal is interrupted and for a predetermined interval occurring at a different time from that during which the pulse signal is interrupted thereby to create a series of notches in the reference signal waveform, means to combine and detect the reference signal and the pulse signal, means to sample during uniformly spaced intervals successively the peak amplitude of the detected signal when the notches occur in the reference signal and when the pulse signal is interrupted, means to produce a signal having the form of a continuous series of sawtooths in response to the samples of the detected signal, a differentiating circuit, said sawtooth signal being applied to said differentiating circuit to produce pulses representative of the sharply rising edges of the sawtooths, a gate circuit to pass said pulses at selected times, means to condition said gate circuit to pass said pulses at the times when said reference signal is interrupted and means to indicate the absence of pulses from said gate circuit.

References Cited in the file of this patent
UNITED STATES PATENTS
2,843,824    Whittier _____ July 15, 1958